United States Patent Office 2,716,123
Patented Aug. 23, 1955

2,716,123

DIEPOXIDES OF CYCLOALIPHATIC ESTERS

Frederick C. Frostick, Jr. and Benjamin Phillips, Charleston, W. Va., assignors to Union Carbide and Carbon Corporation, a corporation of New York No Drawing. Application August 13, 1953,
Serial No. 374,145

8 Claims. (Cl. 260—348)

This invention relates to a new class of organic compounds which are useful in the plastics and resins industry and more particularly, this invention relates to a new class of diepoxide compounds prepared from cycloaliphatic esters.

The compounds of this invention may be conveniently represented by the following general formula:

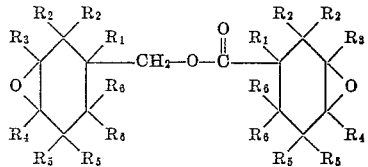

wherein $R_1$, $R_2$, $R_3$, $R_4$, $R_5$ and $R_6$ represents a hydrogen atom or an aliphatic hydrocarbon radical.

The compounds of this invention are useful as modifiers and plasticizers for certain types of synthetic condensation resins and are particularly adapted for use as stabilizers for various synthetic resins.

Furthermore, the compounds of this invention are useful as intermediates in the production of products suitable for use in the fields of surface coatings, laminates and plastic molding compositions.

The compounds of this invention are produced by the epoxidation of the olefinic linkages contained in the starting material, such as, for example, 3-cyclohexenyl-methyl-3-cyclohexenecarboxylate, and may be prepared by either of two oxidation procedures, both of which are satisfactory and provide commercially acceptable yields.

The first oxidation method is called the acetaldehyde monoperacetate method and the reaction whereby the epoxides are formed may be illustrated by the following equation:

*Acetaldehyde monoperacetate method*

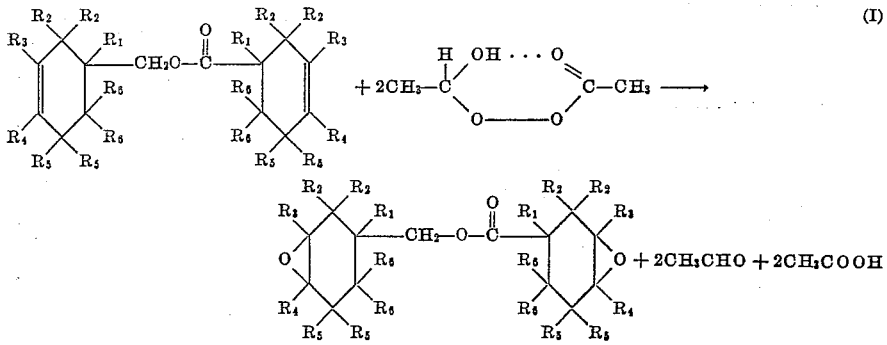

wherein $R_1$ through $R_6$ represent a hydrogen atom or an aliphatic hydrocarbon radical.

The second oxidation method is called the peracetic acid method and the reaction whereby the epoxides are formed may be illustrated by the following equation:

*Peracetic acid method*

(II)

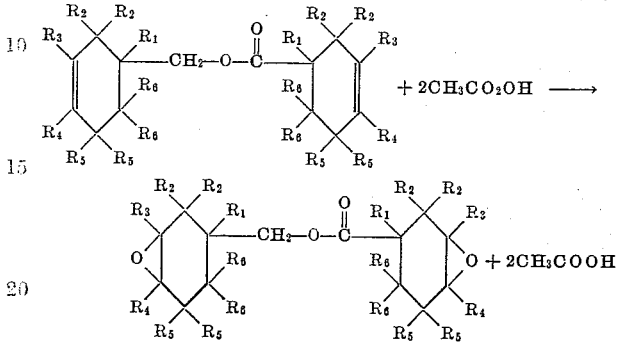

wherein $R_1$ through $R_6$ represent a hydrogen atom or an aliphatic hydrocarbon radical.

The use of peracetic acid as the oxidizing agent is particularly well suited for the epoxidation reaction since the cyclohexenyl ring is relatively easily converted to the corresponding epoxy form. This particular ability of the peracetic acid and other peracids, in general, to promote clean cut reactions and provide acceptable yields is not unusual in the art of oxidizing organic compounds for it has long been recognized that the percarboxylic acids occupy somewhat a unique position in the field of oxidizing reagents since they are able to effect several specific types of chemical transformations with acceptable efficiencies, while other powerful oxidizing reagents, such as potassium permanganate, are not.

One such type of chemical transformation that the peracids are able to effect is that type of reaction which makes available the compounds of this invention, that is, the oxidation of unsaturated organic compounds to produce the corresponding epoxides.

The unsaturated cycloaliphatic esters which are used as starting materials in preparing the epoxy compounds of this invention may be prepared by subjecting selected cyclic unsaturated aldehydes to the well known Tischenko reaction. The reaction whereby these diunsaturated (I)

esters may be prepared may be suitably illustrated by the following general equation:

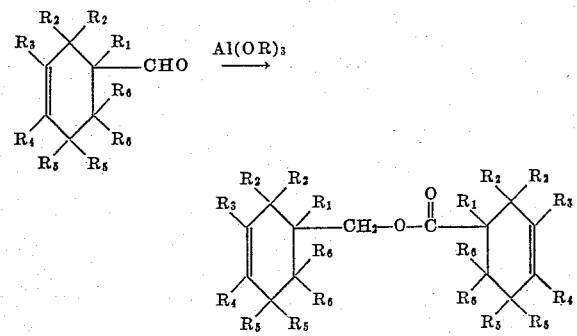

wherein $R_1$ through $R_6$ represent a hydrogen atom or an aliphatic hydrocarbon radical.

The cyclic unsaturated aldehydes, in turn, may be synthesized by reacting butadiene or homologs of butadiene with alpha, beta-unsaturated aliphatic aldehydes, such as, for example, acrolein, methacrolein, crotonaldehyde and the like. Typical unsaturated aldehydes are reported in the literature by Sobecki, Ber. 43, 1040 (1910); Diels and Alder, Ann. 460, 106, 121 (1928); Ann. 470, 62–103 (1929) and in their U. S. Patent 1,944,731.

The following list will illustrate the wide variety of reactants which may be employed to produce the cycloaliphatic aldehydes suitable for use in the Tischenko reaction for preparing the starting materials utilized in this invention:

Acrolein and butadiene
Crotonaldehyde and butadiene
Methacrolein and butadiene
Acrolein and isoprene
Crotonaldehyde and isoprene
Methacrolein and isoprene
Acrolein and 1,3-pentadiene
Crotonaldehyde and 1,3-pentadiene
Methacrolein and 1,3-pentadiene As may be readily seen, from the above list, alkyl groups may be introduced into the final product merely by properly selecting a suitable starting material.

As may be readily seen the products of this invention are particularly attractive in view of the fact that they are potentially low-cost chemicals since butadiene and the alpha, beta-unsaturated aldehydes are economical starting materials and the steps required to produce the epoxides are conducted with high efficiencies.

The reaction conditions suitable for making epoxides vary widely. The temperatures employed in producing the epoxides may range from $-25°$ C. to about $150°$ C. The preferred method of making the epoxides consists in mixing the starting material and an excess of peracetic acid solution at a temperature in the range $10°$ C. to $90°$ C. and after completion of the reaction, rapidly removing all low boiling constituents and recovering the product by any convenient means such as, for example, distillation or extraction.

The following examples will serve to illustrate the practice of the invention.

EXAMPLE I

*Preparation of 3-cyclohexenylmethyl 3-cyclohexenecarboxylate*

Aluminum isopropoxide (102 grams, 0.5 mol) was dissolved in 900 grams of dry benzene in a 5-liter glass flask fitted with a stirrer and a dropping funnel. The stirred contents of the flask were maintained at $20°$ C.–$25°$ C. by immersing the flask in a water bath, and 220 grams (20 mols) of 3-cyclohexenecarboxaldehyde were added dropwise over a period of 5 hours. After all the aldehyde was added, the reaction solution was left standing at the same temperature for 16 hours, and then mixed with 83 ml. of concentrated hydrochloric acid. The aqueous layer was separated off, and the organic layer was then fractionally distilled. There was obtained 1932 grams (88 per cent yield) of 3-cyclohexenylmethyl 3-cyclohexenecarboxylate, B. P. $129°$ C.–$130°$ C. at 3 mm. $n_D^{30}$ 1.4940.

EXAMPLE II

*Preparation of 1-methyl-3-cyclohexenylmethyl 1-methyl-3-cyclohexenecarboxylate*

Aluminum isopropoxide (7.7 grams, 0.0375 mol) was dissolved in 150 grams of dry benzene in a one-liter flask fitted with a stirrer and dropping funnel. The stirred contents of the flask were maintained at $20°$ C.–$25°$ C. by immersing the flask in a water bath, and 192 grams (1.55 mols) of 1-methyl-3-cyclohexenecarboxaldehyde were added dropwise over 40 minutes. The reaction was allowed to proceed for a period of 18½ hours, and then 7 grams (0.118 mol) of acetic acid was added to neutralize the catalyst. The reaction solution was distilled and there was obtained 88 grams (45 per cent yield) of 1-methyl-3-cyclohexenylmethyl 1-methyl-3-cyclohexenecarboxylate, B. P. $136°$ C.–$140°$ C. at 3 mm., $n_D^{30}$ 1.4860.

EXAMPLE III

*Preparation of 6-methyl-3-cyclohexenylmethyl 6-methyl-3-cyclohexenecarboxylate*

Aluminum isopropoxide (102 grams, 0.5 mol) was dissolved in 800 grams dry benzene in a 5-liter glass flask fitted with a stirrer and dropping funnel. The contents of the flask were stirred and kept at $20°$ C.–$25°$ C. by immersing the flask in a water bath, and 2480 grams (20 mols) of 6-methyl-3-cyclohexenecarboxaldehyde were added through the dropping funnel over a period of four hours. After addition of the aldehyde, the reaction solution was allowed to stand at the same temperature for 16 hours, and then 152 grams of acetic acid was added to neutralize the aluminum isopropylate. After thorough mixing, the reaction solution was fractionally distilled, and there was obtained 1938 grams of 6-methyl-3-cyclohexenylmethyl 6-methyl-3-cyclohexenecarboxylate, B. P. $133°$ C. at a mm., $n_D^{20}$ 1.4870. The yield was 78.3 per cent.

EXAMPLE IV

*Preparation of 3,4-epoxycyclohexylmethyl 3,4-epoxycyclohexanecarboxylate*

To 144 grams (0.655 mol) of 3-cyclohexenylmethyl 3-cyclohexenecarboxylate in a 1-liter flask was added dropwise over a period of two and one-fourth hours 488 grams of a 25.5 per cent solution of peracetic acid in acetone (124 grams, 1.64 mols, of peracetic acid). The stirred reaction solution was maintained at $20°$ C.–$25°$ C. by immersing the reaction flask in a cold water bath. After the addition was complete, the reaction flask was immersed in a cold bath ($-11°$ C.) and allowed to stand for 16 hours. The contents of the flask were then added dropwise to a still kettle containing ethyl benzene refluxing under reduced pressure at $40°$ C.–$45°$ C. kettle temperature. During the addition, there was distilled off at the head a mixture of acetone, acetic acid, peracetic acid and ethyl benzene. After addition was complete, the remaining low-boiling materials were distilled off, and there was obtained 164 grams of residue product analyzing 86 per cent purity as 3,4-epoxycyclohexylmethyl 3,4-epoxycyclohexanecarboxylate by determination of epoxide groups, 10.7 per cent unreacted 3-cyclohexenylmethyl 3-cyclohexenecarboxylate by determination of double bonds, and 0.2 per cent acidic impurities calculated acetic acid. The yield of diepoxide was 85.5 per cent.

EXAMPLE V

*Preparation of 3,4-epoxy-1-methylcyclohexylmethyl 3,4-epoxy-1-methylcyclohexanecarboxylate*

To 84 grams (0.338 mol) of 1-methyl-3-cyclohexenylmethyl 1-methyl-3-cyclohexenecarboxylate in a one-liter flask was added dropwise over a period of one and one-half hours 308 grams of a 25 per cent solution of peracetic acid in acetone (77 grams, 1.01 mols, of peracetic acid). The stirred reaction solution was maintained at 35° C.–40° C. by immersing the reaction flask in a water bath. After the addition was complete, the reaction solution was stirred at 35° C.–40° C. for 1½ hours and then stored at −11° C. for 16 hours. Analysis at this time indicated 89.6 per cent of the theoretical amount of peracetic acid had reacted. The reaction solution was heated to 40° C. and stirred for another two hours at which time analysis for peracetic acid showed 94.5 per cent had reacted. The solution was added dropwise to a still kettle containing 4400 grams of ethylbenzene refluxing under reduced pressure at 40° C.–45° C. kettle temperature. During the addition, there was distilled off at the head a mixture of acetone, acetic acid, peracetic acid and ethylbenzene. After addition was complete, the remaining low-boiling materials were distilled off, and there was obtained 97 grams of residue product analyzing 82 per cent 3,4-epoxy-1-methylcyclohexylmethyl 3,4-epoxy-1-methylcyclohexanecarboxylate by determination of epoxide groups, 1.6 per cent unreacted 1-methyl-3-cyclohexenylmethyl 1-methyl-3-cyclohexenecarboxylate by determination of double bonds, and 0.2 per cent acidic impurities calculated as acetic acid. The yield of diepoxide was 84 per cent.

The residue product (75 grams) was distilled without fractionation to yield 67 grams of colorless liquid, B. P. 180° C.–195° C. at 3 mm., $n_D^{30}$ 1.4855, which analyzed 83.5 per cent 3,4-epoxy-1-methylcyclohexylmethyl 3,4-epoxy-1-methylcyclohexanecarboxylate by analysis for epoxide groups and 1.95 per cent 1-methyl-3-cyclohexenylmethyl 1-methyl-3-cyclohexenecarboxylate by analysis for double bonds.

EXAMPLE VI

*Preparation of 6-methyl-3,4-epoxycyclohexylmethyl 6-methyl-3,4-epoxycyclohexanecarboxylate*

To 620 grams (2.5 mols) of 6-methyl-3-cyclohexenylmethyl 6-methyl-3-cyclohexenecarboxylate in a 5-liter flask was added dropwise over a period of six and one-half hours 2690 grams of a 21.6 per cent solution of peracetic acid in acetone (570 grams, 7.5 mols, of peracetic acid). The contents of the flask were stirred and maintained at 40° C. during the addition by immersing the reaction flask in a water bath. After addition was complete, the reaction conditions were maintained for an additional one-half hour and then the reaction flask was immersed in a cold bath at −11° C. for 16 hours. Analysis at the end of this period indicated 98.7 per cent of the theoretical amount of peracetic acid was used up. The reaction solution was then heated to 42° C. and maintained there for an additional one and one-half hours, and then analysis indicated 100 per cent of the theoretical amount of peracetic acid had been consumed.

The reaction solution was then added dropwise to a still kettle containing 1400 grams of ethyl benzene refluxing at 25 mm. pressure. Acetone, peracetic acid, acetic acid and ethyl benzene were distilled off at the head during the addition, and after addition was complete all low-boiling material was stripped off up to a kettle temperature of 60° C. at 1 mm. There was obtained 736 grams of residue product which analyzed 85.4 per cent purity as 6-methyl-3,4-epoxycyclohexylmethyl 6-methyl-3,4-epoxycyclohexanecarboxylate by determination of epoxide groups, 3.1 per cent as unreacted 6-methyl-3-cyclohexenemethyl 6-methyl-3-cyclohexenecarboxylate by determination of double bonds, and 0.3 per cent acidity as acetic acid. The yield corresponded to 89.8 per cent.

By distilling a sample of the crude diepoxide under reduced pressure there was obtained a purified product. It was a colorless, sweet-smelling liquid having the following properties: B. P. 335° C. at 760 mm., 185° C.–186° C. at 3 mm.; $n_D^{30}$ 1.4880.

EXAMPLE VII

*Preparation of 3,4-epoxy-(3 and/or 4)-methylcyclohexylmethyl 3,4-epoxy-(3 and/or 4)-methylcyclohexanecarboxylate*

The Diels-Alder adduct of isoprene and acrolein was subjected to a Tischenko condensation as described in Example I. Upon distillation under reduced pressure there was obtained in good yield (3 and/or 4)-methyl-3-cyclohexenylmethyl (3and/or 4)-methyl-3-cyclohexenecarboxylate, a colorless liquid boiling at 160° C.–164° C. at 3 mm. pressure. To 0.371 mol of this mixture of isomeric esters was added a 25 per cent peracetic acid (1.11 mols) solution in acetone over a period of 1.33 hours at 40° C. After an additional 2 hour reaction period the reaction mixture was added to 500 cc. of ethylbenzene (to facilitate removal of the acetic acid) and distilled. The product was a mixture of isomers boiling at 187° C.–195° C. at 3 mm. and having a refractive index range of 1.4822–1.4830 ($n_D^{30}$). The purity, as determined by an analysis for epoxide groups by the pyridine hydrochloride method, was 95 per cent calculated as 3,4-epoxy-(3 and/or 4)-methylcyclohexylmethyl 3,4-epoxy-(3 and/or 4)-methylcyclohexanecarboxylate.

EXAMPLE VIII

*Preparation of 3,4-epoxy-2-methylcyclohexylmethyl 3,4-epoxy-2-methylcyclohexanecarboxylate*

The Dields-Alder adduct of piperylene and acrolein was subjected to a Tischenko condensation as described in Example I. Upon distillation under reduced pressure there was obtained in good yield 2-methyl-3-cyclohexenylmethyl 2-methyl-3-cyclohexenecarboxylate, a colorless liquid boiling at 146° C.–147° C. at 3.0 mm. and having a refractive index of 1.4906 ($n_D^{30}$). To 0.387 mol of this ester was added over a period of 1.67 hours a 25 per cent solution of peracetic acid (1.16 mols) in acetone at 40° C. After an additional 2 hours reaction period the reaction mixture was added to 500 cc. of ethylbenzene (to facilitate the removal of acetic acid) and the volatile components were removed to a kettle temperature of 70° C. at 3 mm. pressure. The residue product (108 grams) analyzed 90 per cent of the corresponding diepoxide. The residue product was fractionated on a short column and gave a 79 per cent yield of 3,4-epoxy-2-methyl-cyclohexylmethyl 3,4-epoxy-2-methylcyclohexanecarboxylate, a colorles liquid having a boiling point of 183° C.–185° C. at 2 mm. and a refractive index of 1.4927 ($n_D^{30}$). The purity was 99.5 per cent as determined by a pyridine hydrochloride analysis for epoxide.

We claim:

1. A diepoxide represented by the general formula:

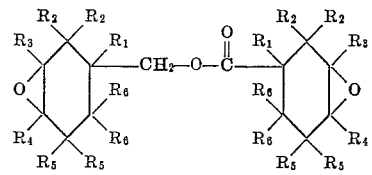

wherein $R_1$ through $R_6$ represent members selected from the group consisting of hydrogen and lower alkyl radicals.

2. 3,4-epoxycyclohexylmethyl - 3,4 - epoxycyclohexanecarboxylate.

3. 3,4 - epoxy-1-methylcyclohexylmethyl-3,4-epoxy-1-methylcyclohexanecarboxylate.

4. 3,4-epoxy-2-methylcyclohexylmethyl - 3,4 - epoxy-2-methylcyclohexanecarboxylate.

5. 3,4-epoxy-6-methylcyclohexylmethyl - 3,4 - epoxy-6-methylcyclohexanecarboxylate.

6. 3,4-epoxy-3-methylcyclohexylmethyl - 3,4 - epoxy-3-methylcyclohexanecarboxylate.

7. 3,4-epoxy-4-methylcyclohexylmethyl - 3,4 - epoxy-4-methylcyclohexanecarboxylate.

8. A lower alkyl substituted 3,4 - epoxycyclohexylmethyl-3,4-epoxycyclohexanecarboxylate.

No references cited.